Patented Jan. 1, 1929.

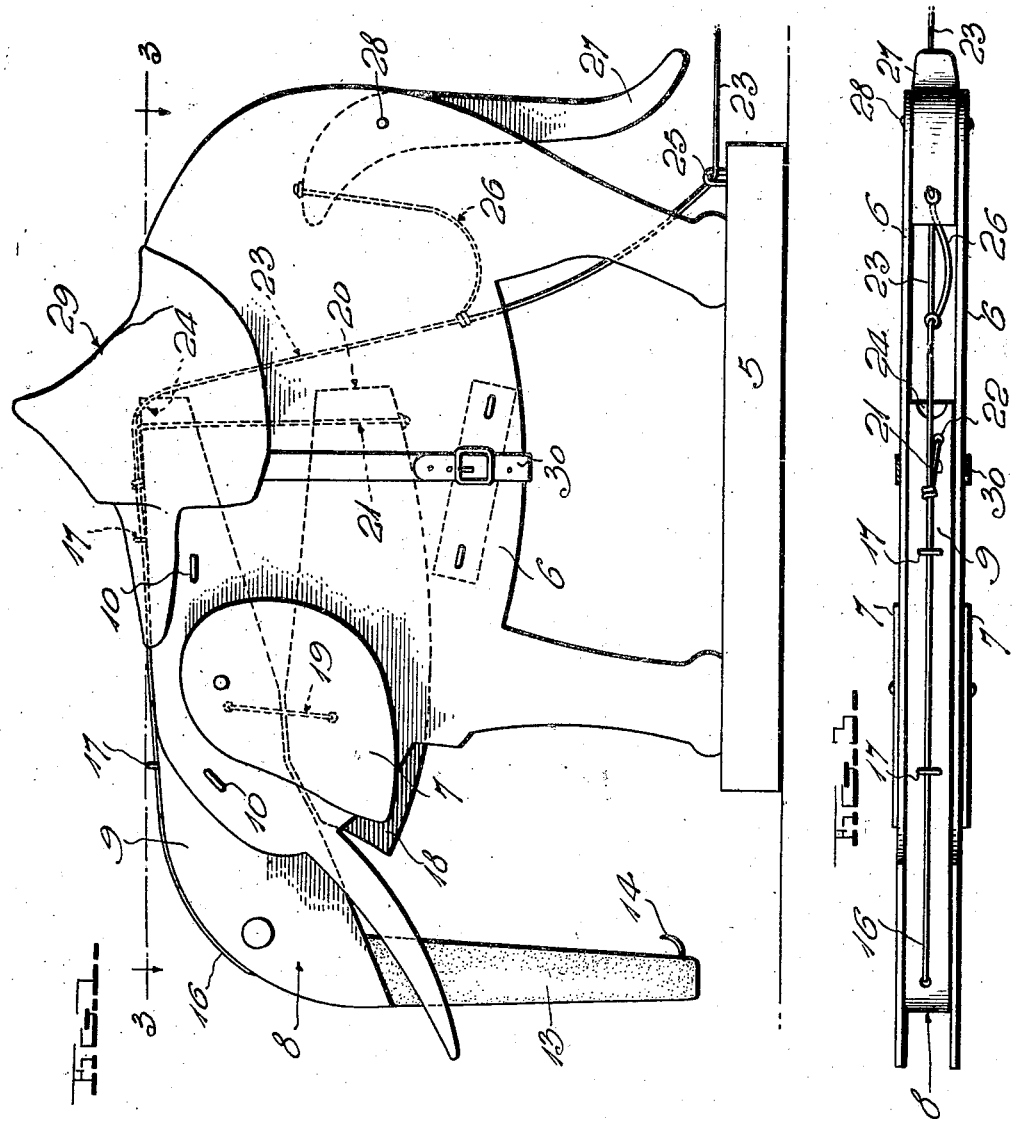

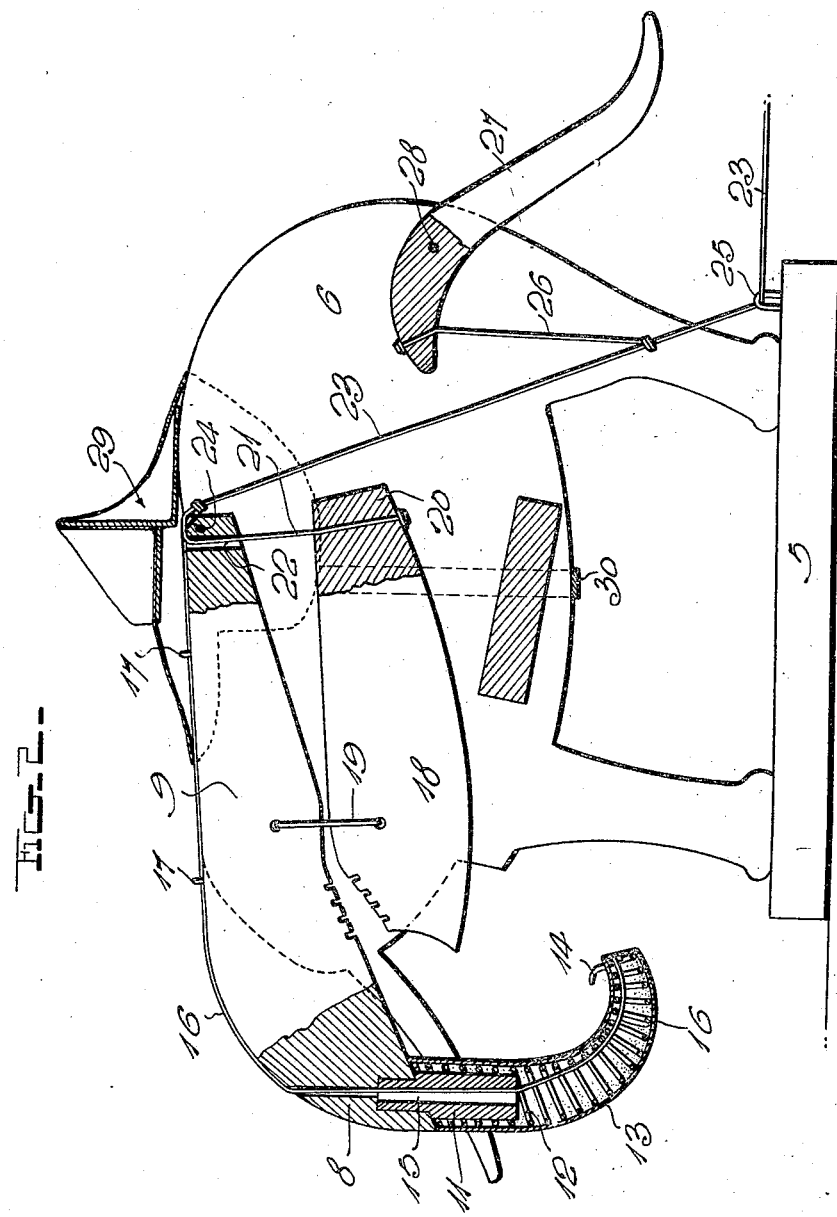

1,697,351

UNITED STATES PATENT OFFICE.

ADOLF FEDDERSEN, OF MURDO, SOUTH DAKOTA.

TOY ELEPHANT.

Application filed October 3, 1927. Serial No. 223,739.

It is the principal object of the present invention to provide a toy elephant in which novel provision is made for turning a flexible trunk upwardly and rearwardly toward the mouth, in a realistic manner.

Another object is to make unique provision whereby the mouth is opened simultaneously with turning the trunk upwardly and rearwardly, and in this connection, yet another aim is to provide means for attaching any desired object to the free end of the trunk giving the appearance that it is being elevated for the purpose of depositing in the open mouth.

Yet another aim is to provide an exceptionally simple and inexpensive construction, yet one which will operate effectively and will possess the required degree of durability.

With the foregoing in view, the invention resides in the novel subject matter hereinafter described and claimed, the description being supplemented by the accompanying drawings.

Fig. 1 is a side elevation of a toy elephant constructed in accordance with my invention, the trunk and the tail being lowered and the lower jaw closed.

Fig. 2 is a longitudinal sectional view partly in elevation showing the trunk curved upwardly and rearwardly, the lower jaw lowered, and the tail raised.

Fig. 3 is a horizontal sectional view on line 3—3 of Fig. 1.

In the preferred form of construction, herein illustrated, I make use of an appropriate base 5 and to it I suitably secure two side members 6 simulating a body and legs. Ears 7 may be suitably connected with the front portion of the body and the head 8 is preferably cut from a piece of wood, said head having a rearwardly projecting attaching portion 9 which is secured between the side members 6 by appropriate fasteners 10. A stub 11, preferably formed of wood, is suitably joined to the lower side of the head and projects downwardly therefrom, and surrounding this stub, is the upper end of a coiled spring 12, said spring projecting a considerable distance below said stub. The spring and the stub are covered with any appropriate flexible covering 13, so that they simulate an elephant's trunk and the lower end of this trunk may be provided with one or more hooks 14 for connecting any desired toy objects thereto. The stub 11 and the overlying portion of the head 8 are formed with a passage 15 for a pull cord or other line 16, this line being connected at its lower end to the lower end of the trunk, said line passing downwardly within the spring 12, as clearly shown in Fig. 2. From the upper end of the passage 15, the line 16 extends rearwardly along the upper edge of the head 8 and its attaching portion 9, suitable guides such as the staples 17, being provided for this rearwardly extending portion of the line. A pull upon the line 16 will curve the trunk rearwardly and upwardly as shown in Fig. 2, and when the line is released, the spring 12 again restores the trunk to a lowered position.

Under the head 8, is a movable jaw 18 which may be pivotally mounted in any desired manner, for instance upon a link 19 whose upper end is connected with the attaching portion 9 of said head. This lower jaw is provided with a lever portion 20 which projects rearwardly between the side members 6 and normally has its rear end spaced below the attaching portion 9, so that the mouth of the simulation will be closed. A second pull line 21, however, is connected to the rear end of the lever portion 20 and extends upwardly therefrom through a guide opening 22 in the attaching portion 9. This line 21 is connected with the adjacent portion of the line 16 and a common pull line 23 is preferably attached to said lines at their points of connection. Thus, a pull upon the line 23 will swing the lever portion 20 upwardly at the time of curving the trunk upwardly and rearwardly, thereby effecting opening movement of the lower jaw 18. Thus, a very realistic representation of natural movements of an elephant, is effected, and when any object is hooked upon the hooks 14, the appearance is that of an elephant raising something to his open mouth, with his trunk.

The pull line 23 preferably passes downwardly through a guide groove 24 in the rear end of the attaching portion 10 and extends through a suitable guide 25 on the rear end of the base. If desired, this line may be connected by a branch 26 with a tail 27, the latter being pivoted at 28 between the side members 6. When this arrangement is used, the tail will be swung upwardly simultaneously with opening of the mouth, and upward and rearward turning of the trunk, thus still further simulating the movements of an elephant.

Obviously, the toy may be painted and finished in any desired manner and may have any preferred accoutrements such as 29 and 30.

On account of the existing advantages for the details of construction herein disclosed, such details are preferably followed. However, within the scope of the invention as claimed, variations may of course be made.

I claim:—

1. In a toy elephant, a body, a head having a flexible trunk, a pivoted lower jaw, and pull lines connected with the trunk and jaw to effect upward and rearward curving of the trunk and lowering of the jaw as when feeding.

2. In a toy elephant, a body, a head having a rearwardly projecting attaching portion secured to said body, a flexible trunk on said head, a pivoted lower jaw having a lever portion extending rearwardly under said attaching portion, a pull line connected with the trunk and extending to the rear end of said attaching portion, the latter having an opening, and a second pull line passing through said opening and connected to said lever portion.

3. In a toy elephant, a body, a head having a rearwardly projecting attaching portion secured to said body, a flexible trunk on said head, a pivoted lower jaw having a lever portion extending rearwardly under said attaching portion, a pull line connected with the trunk and extending to the rear end of said attaching portion, the latter having an opening, and a second pull line passing through said opening and connected to said lever portion, the two lines being connected with each other for simultaneous pulling, whereby the jaw may be opened and the trunk simultaneously curved upwardly and rearwardly.

4. A toy comprising a simulation of an elephant, said simulation having a flexible trunk and a mouth embodying a movable lower jaw, means for curving the lower end of said trunk rearwardly and upwardly substantially to said mouth, and means for opening said movable jaw as the trunk end is curved toward the mouth, giving a realistic representation of an elephant's actions when eating.

In testimony whereof I have hereunto affixed my signature.

ADOLF FEDDERSEN.